United States Patent

[11] 3,582,772

| [72] | Inventor | Herman J. Hammer<br>Brooklyn, Ohio |
|---|---|---|
| [21] | Appl. No. | 779,731 |
| [22] | Filed | Nov. 29, 1968 |
| [45] | Patented | June 1, 1971 |
| [73] | Assignee | Republic Steel Corporation<br>Cleveland, Ohio |

[54] METHOD OF CALIBRATING EDDY CURRENT FLAW DETECTION EQUIPMENT UTILIZING ATTACHABLE SLUGS TO SIMULATE FLAWS
10 Claims, 4 Drawing Figs.

[52] U.S. Cl. ..................................... 324/40
[51] Int. Cl. ..................................... G01r 33/12
[50] Field of Search ........................... 324/40, 37

[56] References Cited
UNITED STATES PATENTS
2,918,621  12/1959  Callan et al. ............... 324/37

Primary Examiner—Rudolph V. Rolinec
Assistant Examiner—R. J. Corcoran
Attorneys—Robert P. Wright and Joseph W. Malleck ABSTRACT: A method of calibrating eddy current flaw detection equipment comprises placing one or more metallic slugs in surface contact with a material of a type to be tested. The equipment is adjusted to respond to the presence of the slug or slugs producing electrical indications which are equated to defects of one or more levels of severity.

PATENTED JUN 1 1971 3,582,772

INVENTOR.
HERMAN J. HAMMER
BY Watts, Hoffmann,
Fisher & Heinke
ATTORNEYS.

METHOD OF CALIBRATING EDDY CURRENT FLAW DETECTION EQUIPMENT UTILIZING ATTACHABLE SLUGS TO SIMULATE FLAWS

BACKGROUND OF THE INVENTION

1. Field of the Invention.

This invention relates to eddy current flaw detection equipment for detecting flaws in metallic workpieces and, more particularly, to a method for calibrating such flaw detection equipment to detect flaws of one or more degrees of severity.

2. Description of the Prior Art.

Eddy current flaw detection apparatus is well-known in the art. For example, such apparatus is described in U.S. Pat. No. RE 21,003, reissued Feb. 14, 1939 to Knerr and Farrow and entitled "Method and Apparatus for Testing Metal Articles for Defects," in U.S. Pat. No. 2,416,517, issued Feb. 29, 1947 to Cecil Farrow and entitled "Method and Apparatus for Determining Phase Shift," and in U.S. Pat. No. 3,422,346 Issued Jan. 14, 1969 to H. J. Hammer for "Eddy Current Inspection System." Such apparatus is particularly useful in locating flaws such as cracks, seams, laps, breaks and slivers in tubular metallic workpieces by measurements conducted on the surface of the workpiece. The apparatus described in the patents includes two sets of primary and secondary coils, one set surrounding an article being tested and the other surrounding a similar standard article. The primary coils (exciting coils) are energized by an alternating current signal, which induces currents in the standard article and in the article being tested. These currents in turn induce currents in the two secondary coils (pickup coils) which are 180° out of phase with each other in the absence of a flaw in the article being tested. The presence of a flaw produces a phase shift between the two secondary coil currents. This difference in phase may be detected in a balanced bridge arrangement and utilized to actuate an alarm or other indicator.

A relatively recent improvement in eddy current testing apparatus is described in the referenced Hammer patent. In that system neither a balanced bridge nor a standard article are utilized. The exciting coil is energized with a continuous carrier signal, which then induces an eddy current in the workpiece. The eddy current in the workpiece induces a current signal in a pickup coil assembly. The signal output of the pickup coil assembly is coupled to a defect signal input of a phase detecting device. The carrier signal which energizes the exciting coil is also introduced to a reference signal input of the phase detecting device. The output from the phase detecting device is then a function of the angular displacement or phase difference between the carrier signal voltage introduced at its defect signal input and the alternating current reference voltage impressed at its reference signal input. The output of the phase detecting device is integrated by a suitable capacitive device and then differentiated by a high pass filter. The differentiated signal pulse is amplified and then coupled to an alarm circuit or other system for indicating or otherwise acting upon the defective workpiece. It has been found that the frequency of oscillations of the oscillator determines how deeply into the workpiece the electromagnetic field produced by them permeates a relatively thin-walled workpiece may use a higher frequency oscillation than does a thicker-walled workpiece to attain this depth insensitivity. If the oscillator frequency is so adjusted that the magnetic field permeates the test piece, the depth at which a flaw is located in the workpiece, provided its radial dimension is substantially less than the wall thickness, has little effect on the magnitude of the output signal provided to the indicating means. Only the magnitude (area in a longitudinal plane and/or volume) of a flaw affects the amplitude of the output signal of the apparatus. As applied to the testing of pipe or tubing, the oscillator frequency may vary from 400 to 40,000 cycles per second depending on the wall thickness, and is determined empirically.

There are numerous applications in which flaws of varying extents or magnitudes (radial depth, area in a longitudinal plane, or volume) indicate that a workpiece in which they occur must be treated according to the magnitude of the flaw. That is, if there are a few flaws of relatively minor magnitude, the workpiece may be usable as is or it may be in a condition to be salvaged. On the other hand, a flaw of greater magnitude may make the workpiece completely unusable and it must be scrapped. Apparatus adapted for this latter use is described in U.S. Pat. No. 3,263,809, issued Aug. 2, 1966 to Joseph M. Mandula, Jr. and Tyler W. Judd for "Apparatus for Defect Analysis and Classification of Workpieces."

Regardless of the type of eddy current detection apparatus being used, it must be properly calibrated. In one case, it must be calibrated to detect and respond to flaws of more than a predetermined severity. In another case, it must be calibrated to differentiate between flaws of different predetermined degrees of severity.

It has been customary, when using apparatus embodying the disclosures of the referenced patents in testing pipe or tubing, to calibrate the apparatus by creating one or more artificial defects in a sample workpiece of a material like that which the apparatus is to be used to inspect. Such artificially created defects, or calibration benchmarks, have generally taken the form of holes drilled into the sample workpiece. The signal amplitude produced by such artificial defects can be equated with diameter and depth of the drilled hole. This practice has a number of disadvantages.

First, it is common practice to use an actual piece of production material, such as a tube, as a calibration sample. Thus, holes drilled in a perfectly sound tube for calibration purposes make that section of the tube defective and unusable.

Second, calibration holes must sometimes be drilled to calibrate test equipment for a production tube welder which is continuously threaded with tubing. This must be done with a manually supported, high-speed portable drill. Considerable skill and practice is required even under the best of circumstances to drill calibration holes, which are usually 0.020 inches to 0.040 inches in diameter. When the drill is manually supported the accuracy of the calibration holes is questionable.

Third, if the material of the tube is steel having 0.3 percent carbon content or more, it is almost impossible to drill calibration holes by hand.

Accordingly, a primary and general object of the invention is to provide a method of calibrating eddy current test equipment, which is highly accurate and is nondestructive with respect to a calibration sample of material.

SUMMARY OF THE INVENTION

In accordance with the invention, highly accurate, nondestructive calibration of eddy current flaw detection equipment is obtained by placing one or more metallic slugs in surface contact with a sample of material of a type to be tested. As the sample bearing the slugs passes through the detection equipment, magnetic field fluctuations are produced by the slugs. These fluctuations cause the flaw detection equipment to produce flaw indicating signals whose amplitudes are functions of the volumes of the slugs. Slugs with large volumes produce indications with greater amplitude than slugs with smaller volumes. The amplitude of the indications caused by the slugs is proportional to the volumes of those slugs. The calibration slugs are kept as thin as possible, so that a workpiece having the slugs attached to its surface can pass between conveyor rolls and through a defect-sensing coil assembly without interference.

The slugs can then be used to produce calibration or benchmark indications of predictable amplitude to aid in calibrating or adjusting eddy current inspection equipment to provide consistent inspection from shift to shift or day to day. The size of the slug is selected by the amplitude of the defect indication which it will cause the inspection equipment to produce. Tube diameter and wall thickness have very little effect on the amplitude of the indication provided by a slug of a given size.

For any given size flaw to be simulated, it is possible to mathematically compute the required volume of a slug; however, preferably the volume of a slug is empirically calculated. One method of calculating the size of a slug is to pass a workpiece having a flaw of predetermined dimension beneath the eddy current detector. When the flaw of predetermined dimensions is detected, the value of the output indication is noted. A slug is then secured to the surface of the workpiece and is passed under the eddy current detector. The dimensions of the slug are then altered until the output indication developed by the eddy current detector is similar to that developed by the flaw of predetermined dimensions. Then, the slug, which simulates the flaw of predetermined dimensions, may be utilized to recalibrate the eddy current detector on a day-by-day basis, or may be utilized to calibrate other eddy current detectors.

DESCRIPTION OF A PREFERRED EMBODIMENT

The method of the present invention will be described in connection with apparatus such as disclosed in U.S. Pat. No. 3,422,346 previously noted. In that type of apparatus, all defects of more than one predetermined degree of severity affect it. It is particularly pointed out, however, that the method of the present invention is not limited in its use to any particular eddy current flaw detection equipment. It is just as useful in calibrating multiple channel equipment which detects a plurality of different degrees of defect severity, as in calibrating single channel equipment which detects only flaws having more than a predetermined severity. As used herein, the term "magnitude," when referring to a flaw, is taken to mean the radial depth, area in a longitudinal plane, or volume of the flaw.

Figure 1:
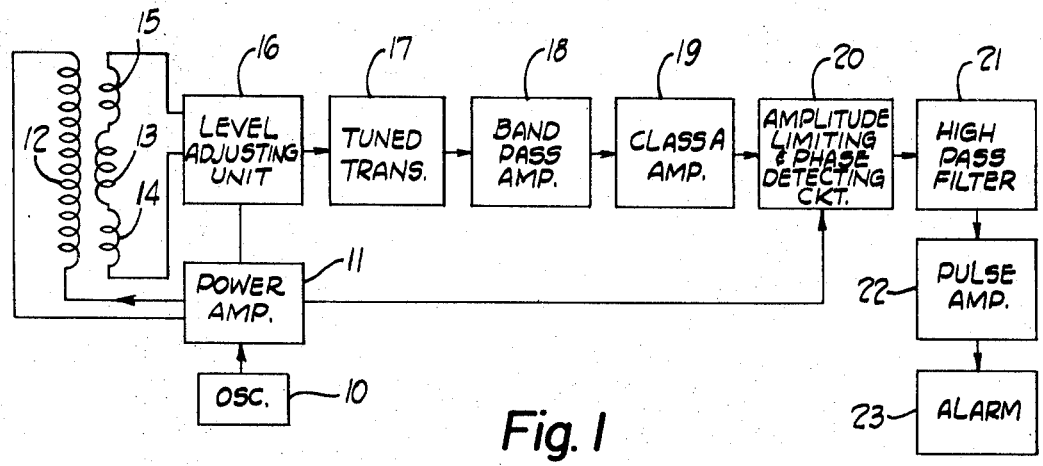
FIG. 1 is a block diagram of eddy current flaw detecting equipment with which the present invention is useful.

As shown in FIG. 1, an oscillator 10 supplies a high frequency voltage to a push-pull amplifier driver and phase inverter 11. The push-pull amplifier 11 supplies an exciting current to an exciting coil winding 12. Alternating current AC flowing through the exciting coil 12 induces an eddy current flow in a tubular workpiece 32 (FIG. 3) as the workpiece passes through a testing coil assembly comprised of the exciting coil 12 and testing or pickup coils 13—15. Magnetic flux produced by the current flowing in the tubular workpiece 32 induces an AC voltage in the detector coils 13—15. The detector coils 14, 15 are differentially wound relative to the winding 13 so that the voltage induced in the winding 13 is nearly cancelled by the sum of the voltages induced in the coils 14—15. The pickup coils 13—15 are connected to an input of a carrier level adjusting (balance) unit 16 which partially compensates for large imbalances between the voltages induced in the main detector coil 13 and that induced in the differential coils 14, 15.

Output of the carrier level adjusting unit 16 is coupled by a tuned impedance matching transformer 17 to an input of a band-pass amplifier 18. The band-pass amplifier 18 amplifies and passes the fundamental frequency of the carrier signal to a Class A amplifier 19. There the carrier signal is amplified and introduced to the input of an amplitude limiter and phase detector 20. A reference voltage is also introduced to the amplitude limiter and phase detector 20 from the power amplifier 11. The amplitude limiter and phase detector 20 compares the reference signal to the carrier signal for a predetermined phase difference. A defect in a workpiece passing through the testing coil assembly affects the amplitude and phase of the carrier signal. The phase detector 20 detects this phase change in the carrier signal by comparing it to the reference signal and produces an output defect pulse whenever a predetermined phase difference appears in the two signals. The amplitude limiting action of the detector 20 ignores the small amplitude changes in the carrier signals which are caused by variables and not defects. The output defect pulse is differentiated by a high pass filter 21 and is introduced to a pulse amplifier 22 where it is amplified sufficiently to operate an alarm circuit 23 or other indicating or marking apparatus.

The calibration method of the present invention is particularly well adapted for use with eddy current detection apparatus in which the frequency of the oscillator 10 is so adjusted that the electromagnetic field produced by its oscillations permeates the depth of the workpiece, or, in case the workpiece is a pipe or tube, permeates the wall. In that case, the position of a flaw in a workpiece in a direction normal to the direction of movement of the workpiece adjacent the testing coil assembly has little bearing on the amplitude of the signal produced by the pulse amplifier 22. In other words, a flaw such as a shallow longitudinal crack located on the inside of a pipe away from the testing coil assembly will produce a signal of approximately the same amplitude as will the same flaw located on the outside of the pipe adjacent the testing coil assembly. It is understood that, although the method of the present invention is exceedingly useful in calibrating apparatus for this particular use, it is not limited to that use.

The block diagram shown in FIG. 1 is the same as the diagram shown in FIG. 1 of the referenced Pat. No. 3,422,346. Reference is made to that application for a detailed description of the construction and functions of the elements shown in FIG. 1 of this application. It is also pointed out that such an apparatus may have more than one channel. For example, it may well have two or even three channels for detecting minor, medium and severe defects.

A longstanding troublesome aspect in using such detection apparatus has been that of calibrating it. As previously noted, it has heretofore been the practice to drill holes of various diameters into a sample workpiece and use those holes to calibrate the apparatus. This, of course, completely destroys the utility of what would otherwise be a usable workpiece. The present invention provides a nondestructive method of calibration of such apparatus by using one or more slugs, such as those shown in FIG. 2.

It has been discovered that small metal slugs attached to the surface of a metal workpiece cause the eddy current flaw detection equipment to produce defectlike indications with electrical characteristics such as carrier phase shift and amplitude modulation substantially identical to natural flaws or to the drilled holes previously used, when the frequency of the oscillator of the test equipment is such as to cause the magnetic field to permeate entirely the walls of the workpiece. It has also been found that this reaction is produced when the metal slugs have approximately the same permeability and electrical conductivity as the workpiece undergoing test. Thus, the need for using drilled holes or other destructive artificial defects for calibrating eddy current testing equipment may be avoided. It has further been found that the amplitude of the electrical defect indicating signal is a function of the volume of the slug attached to the workpiece. That is, slugs with large volumes produce defect indications of greater amplitude than do slugs with small volumes.

Eddy current flaw detection equipment is generally used directly on the production line in a steel mill. In such an application, the test piece such as tubing must pass between conveyor rolls and, in some instances, through a defect testing coil assembly with close clearance. Therefore, it is desirable to keep the calibration slugs as thin as possible, usually 0.010 inches or less in thickness.

Figure 2:
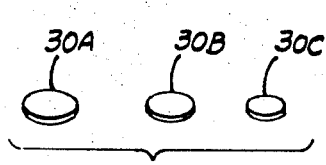
FIG. 2 is a perspective view of several metallic slugs used in practicing the invention.

A representative set of calibration slugs is illustrated in FIG. 2. The set shown comprises three slugs 30A, 30B, 30C. which are all of the same thickness but of various diameters and hence of various volumes. Typically, the slugs are all of 0.005 inch thickness, and the three slugs 30A, 30B, 30C may respectively be of three-sixteenth inch, one-eighth inch and three thirty-seconds inch diameters and used to establish low, medium and high sensitivity levels, respectively. As previously mentioned, the slugs should be of essentially the same material and have had the same treatment as the workpiece or pieces to be tested. This is necessary in order for them to exhibit essentially the same magnetic permeability and electrical conductivity as the test pieces.

It is understood that although three slugs are illustrated, it is not necessary to use three slugs with certain types of eddy current flaw detection equipment. For example, if the equipment merely detects flaws having more than a predetermined degree of severity, it is not necessary to use more than one slug. In other words, one slug is sufficient to calibrate the test equipment to detect flaws of greater than one particular degree of severity. Thus, only one slug is necessary to calibrate the single-channel equipment shown in FIG. 1. One of the slugs 30A, 30B, 30C, depending on the sensitivity desired, would be utilized to adjust the sensitivity control (not shown) in amplitude limiting and phase detecting circuit 20 so that the apparatus is just actuated by the presence of that slug. If a multiple-channel equipment is used, a plurality of slugs would be used to set the sensitivities of the various channels.

Figure 3:
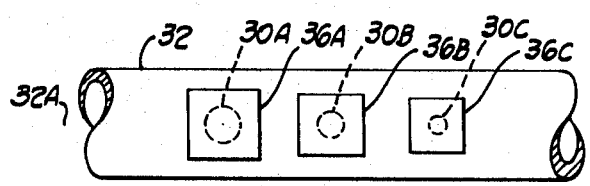
FIG. 3 is a plan view of a workpiece having three calibration slugs attached to its surface.

In calibrating the eddy current test equipment, one or more of the slugs 30A, 30B, 30C are attached to the outside surface of a workpiece to be tested, as shown in FIG. 3. The slugs 30 are shown as taped to the outside surface of a workpiece, such as tube 32, in a substantially straight longitudinal line, parallel to the axis 32A of the tube. Alternatively, the slugs may be attached in a series of steps and the various channels calibrated serially. The direction of movement of the tube through the flaw detection equipment is parallel to the axis 32A of the tube and is shown by an arrow 34. Although the slugs 30 are shown as attached to the outside surface of the tube 32 by means of patches of tape 36A, 36B, 36C, the means of attachment of the slugs to the workpiece is not of importance, so long as there is good electrical contact between the surface of the workpiece and the slugs. Of course, to attain such contact both the surface of the slug and the contacting surface of the workpiece must be clean. Although it is convenient to hold the slugs tightly in place by means of small pieces of masking tape 36, a conductive cement or other conventional means may be employed to secure the slugs in surface contact with the workpiece 32.

Figure 4:
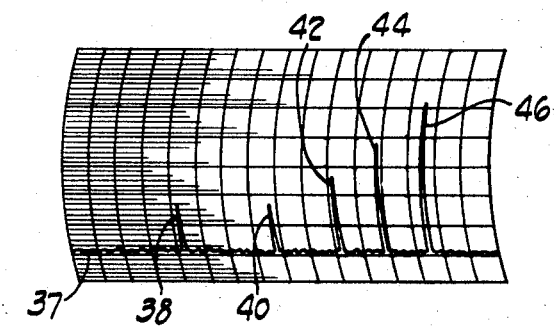
FIG. 4 is a test graph illustrating the amplitude of eddy current flaw-indicating signals produced by a natural flaw and by four slugs of various volumes attached to a workpiece, when the workpiece is passed through the flaw detection equipment illustrated in the block diagram of FIG. 1.

FIG. 4 shows a test graph that illustrates the relative amplitudes of signals provided from the pulse amplifier 22 to the alarm 23 (FIG. 1) in response to a natural defect and to four calibration slugs appearing as defects in a workpiece passing through the detection equipment. The graph shown in FIG. 4 is reproduced from an actual strip recorder trace. In the absence of a defect, either natural or made for calibration purposes, the recording exhibits a relatively steady signal trace 37 with only minor amplitude changes being apparent. A natural defect causes a sudden increase in the amplitude of the output signal of the pulse amplifier 22 (FIG. 1), as is indicated by a signal 38. Signals indicated by the reference numerals 40, 42, 44, 46 result from calibration defects caused by metallic slugs of the type disclosed herein and of different sizes secured to the surface of the test piece.

The test which resulted in the graph shown in FIG. 4 utilized low-carbon content steel slugs, 0.005 inches thick and of various diameters, attached to a 3¼inch outside diameter low-carbon content steel tube having a wall thickness of 0.195 inches. The slugs employed for the test were round wafers accurately punched from soft carbon steel shim stock. They were taped to the outside surface of the tube substantially in a straight longitudinal line, parallel to the tube axis as shown in FIG. 3. The signal shown at 40 resulted from a slug three thirty-seconds inch in diameter; the signal shown in 42 resulted from a slug one-eighth inch in diameter; the signal shown in 44 resulted from a slug five thirty-seconds inch in diameter; and the signal shown at 46 resulted from a slug seven thirty-second inch in diameter. Thus, it is apparent that slugs of various volumes create response signals in an eddy current detector of definite predetermined amplitude levels that may be used to calibrate the various channels of a multichannel detector, or only one slug of a predetermined volume may be utilized to calibrate a single-channel detector.

The method of producing calibration signals for eddy current flaw detecting equipment disclosed herein has enabled operating personnel to calibrate such quality control inspection equipment more frequently and more consistently than would ever have been possible by the use of drilled holes for calibration purposes. As a natural consequence, the result has been much more reliable testing than has heretofore been possible.

It is apparent that various adaptations and changes may be made to the method disclosed herein by one skilled in the art, and it is intended that the appended claims shall cover all such modifications and adaptations as are included within the true spirit and scope of those claims.

I claim:

1. A method of calibrating an eddy current detector for detecting flaws in a metallic workpiece and having circuit means for, upon detection of a flaw, developing an output signal; and variable means coupled to said circuit means for adjusting the value of said output signal, comprising the steps of:
    a. securing to a surface of said workpiece a metallic slug of predetermined dimensions to thereby simulate a flaw of predetermined dimensions;
    b. detecting said slug and said workpiece with said eddy current detector and thereby developing an output signal in said circuit means; and,
    c. adjusting said variable means so that said output signal is of substantially the same value as that value which would be developed by a flaw of said predetermined dimensions when detected by said eddy current detector.

2. The method of claim 1, wherein said workpiece and said slug have substantially identical magnetic permeabilities and electrical conductivities.

3. The method of claims 1, wherein said workpiece and said slug are of the same material substantially identically treated.

4. The method of claim 1 wherein said slug is secured to said workpiece in good electrical contact therewith.

5. The method of claim 4, wherein said slug has a thickness of less than approximately 0.010 inch.

6. A method of calibrating an eddy current detector for detecting flaws in a metallic workpiece and having a plurality of channels; each of said channels having circuit means for, upon detection of a flaw, developing an output signal; and variable means coupled to each said circuit means for adjusting the sensitivity of said circuit means so that said channels are responsive to flaws of different magnitudes and comprising the steps of:
    a. securing to a surface of said workpiece a plurality of metallic slugs of different predetermined dimensions to thereby simulate flaws of different predetermined dimensions;
    b. detecting said slugs and said workpiece with said eddy current detector and thereby developing output signals in the circuit means of the various channels; and,
    c. adjusting said variable means in each channel so that the output signal in each channel is respectively developed in response to the presence of one of said slugs of different dimensions and is of substantially the same value as that which would be developed by one of said flaws of different dimensions, when detected by said eddy current detector so that said channels respectively respond to flaws of different predetermined dimensions.

7. The method of claim 6, wherein said workpiece and said slugs have substantially identical magnetic permeabilities and electrical conductivities.

8. The method of claims 6, wherein said workpiece and said slugs are of the same material substantially identically treated.

9. The method of claim 8, wherein said slugs have thicknesses of less than approximately 0.010 inch.

10. The method of claim 7 wherein said slugs have thicknesses of less than approximately 0.010 inches.